(12) United States Patent
Reusche et al.

(10) Patent No.: US 8,041,200 B2
(45) Date of Patent: Oct. 18, 2011

(54) DEICING SYSTEM AND METHOD

(75) Inventors: Thomas K. Reusche, Elburn, IL (US); Philip E. Chumbley, Aurora, IL (US)

(73) Assignee: Allied Precision Industries, Inc., Elburn, IL (US)

( * ) Notice: Subject to any disclaimer, the term of this patent is extended or adjusted under 35 U.S.C. 154(b) by 405 days.

(21) Appl. No.: 12/235,761

(22) Filed: Sep. 23, 2008

(65) Prior Publication Data

US 2009/0080873 A1 Mar. 26, 2009

Related U.S. Application Data

(60) Provisional application No. 60/975,238, filed on Sep. 26, 2007.

(51) Int. Cl.
*H05B 1/02* (2006.01)
(52) U.S. Cl. ........................................ 392/498; 392/499
(58) Field of Classification Search .................. 392/498, 392/499
See application file for complete search history.

(56) References Cited

U.S. PATENT DOCUMENTS

| | | | | |
|---|---|---|---|---|
| 2,520,576 A * | 8/1950 | Stookey | | 392/499 |
| 2,888,547 A * | 5/1959 | Saper | | 219/523 |
| 3,585,359 A * | 6/1971 | Drugmand | | 392/498 |
| 4,021,643 A * | 5/1977 | Hall et al. | | 219/523 |
| 4,068,116 A * | 1/1978 | McKinstry | | 219/523 |
| 4,602,145 A * | 7/1986 | Roberts | | 392/496 |
| 4,835,366 A * | 5/1989 | Owen et al. | | 392/499 |
| 5,459,812 A * | 10/1995 | Taylor | | 392/498 |
| 5,933,575 A * | 8/1999 | Sanders | | 392/501 |
| 6,778,763 B1 | 8/2004 | Reusche et al. | | |
| 2007/0210068 A1 | 9/2007 | Reusche et al. | | |
| 2008/0002955 A1 | 1/2008 | Reusche et al. | | |

* cited by examiner

*Primary Examiner* — Thor Campbell
(74) *Attorney, Agent, or Firm* — Joseph M. Butscher; The Small Patent Law Group

(57) ABSTRACT

Certain embodiments of the present invention provide a deicing system configured to prevent ice from forming in a water containment vessel. The system includes a heating element configured to heat the water within the containment vessel, a first temperature sensor and a second temperature sensor. The first temperature sensor is electrically connected to the heating element through an electrical path and may be configured to monitor water temperature. The second temperature sensor is electrically connected to the heating element through the electrical path and may be configured to monitor heating element temperature. At least one of the temperature sensors may include a reset button.

17 Claims, 3 Drawing Sheets

DEICING SYSTEM AND METHOD

RELATED APPLICATIONS

The present application relates to and claims priority from U.S. Provisional Application No. 60/975,238, entitled "De-Icer With Resettable Thermostat," filed Sep. 26, 2007, which is hereby incorporated by reference in its entirety.

FIELD OF THE INVENTION

Embodiments of the present invention generally relate to a deicing system and method, and more particularly to a deicing system and method that includes a resettable thermostat.

BACKGROUND OF THE INVENTION

Conventional electric water deicers are used to keep areas of livestock water tanks and ponds free from ice during winter months. Similarly, birdbath deicers and heated birdbaths or pet bowls are used for smaller animals. One type of deicer is a floating deicer in which a buoyant member such as a buoyant ring is attached to a heating element so that the deicer may float on the surface of the water. Another type of deicer is a sinking deicer that is configured to lay at the bottom of a tank or pond, or on a metal guard submerged in the tank. A drain plug deicer is yet another type of deicer that is mounted through a drain hole of a tank and operates similar to a sinking deicer.

Deicers typically include a temperature sensor (e.g., a thermostat) that detects when the water temperature rises above a freezing point. A typical deicer then deactivates a heating element when water is not susceptible to freezing in order to conserve energy. When the temperature sensor detects that the water temperature is at or close to the freezing point, the deicer re-activates the heating element in order to heat the water.

Typically, a deicer includes a single thermostat that is operable to deactivate the heater when water reaches a predetermined temperature. In some configurations, an additional path from the heater to the thermostat is employed to route heat to the thermostat if the deicer is removed from the water or if the containment vessel runs dry. In this case, cooler ambient air causes the deicer to activate and begin heating. Because there is no water to absorb the heat, however, the deicer and/or the containment vessel (such as a livestock water tank or birdbath) begin to heat. The heat reaches the thermostat quicker than normal because water mass is not present to absorb the energy. When the thermostat detects the predetermined deactivation temperature, it trips and the heater is deactivated. The ambient air then cools the deicer until the thermostat detects the predetermined activation temperature and the cycle repeats. The deicer continually cycles on and off even though the containment vessel is substantially or completely devoid of water. Consequently, energy is wasted and the heating element of the deicer typically reaches a much higher temperature in the absence of water, and may pose a fire hazard.

Typically, deicers are designed to trip and reset continually during normal operation in order to regulate the water temperature within a containment vessel between predetermined low and high temperatures. The thermostat closes to energize the heater when the water temperature drops to a point where freezing is possible and remains closed as the water is heated until it reaches the predetermined high temperature point when it opens (trips) and the heater deactivates. The thermostat typically remains open as the water cools until it once again closes and the cycle repeats.

SUMMARY OF THE INVENTION

Certain embodiments of the present invention provide a deicing system configured to prevent ice from forming in a water containment vessel. The system includes a heating element configured to heat the water within the containment vessel, a first temperature sensor and a second temperature sensor. The first temperature sensor is electrically connected to the heating element through an electrical path and is configured to monitor water temperature. The second temperature sensor is electrically connected to the heating element through the electrical path and is configured to monitor heating element temperature (i.e., the temperature of the heating element itself). Each temperature sensor may include a thermostat.

The first temperature sensor may close the electrical path when the water temperature is at or below a predetermined low point. The first temperature sensor may open the electrical path when the water temperature is at or above a predetermined high point.

The second temperature sensor may open the electrical path when the heating element is at or above an overheated point that exceeds the high point. Additionally, the second temperature sensor may include a reset button that is configured to be manually engaged to close the electrical path after the second temperature sensor opens the electrical path.

The deicing system may include an additional temperature sensor that is configured to monitor the water temperature. It may also include another temperature sensor that monitors the heating element temperature.

Certain embodiments of the present invention provide a deicing system that includes a heating element configured to heat the water within the containment vessel, a first temperature sensor and a reset button. The first temperature sensor is electrically connected to the heating element through an electrical path. The first temperature sensor opens the electrical path based on a detected temperature. The reset button operatively connects to the first temperature sensor and is configured to be manually engaged to close the electrical path after the first temperature sensor opens the electrical path based on the detected temperature. The first temperature sensor may be configured to monitor heating element temperature.

Certain embodiments of the present invention provide a method of preventing ice from forming within a water containment vessel. The method includes detecting a temperature of the water within the water containment vessel through a first thermostat, activating a heating element when the temperature of the water is below a predetermined low point, deactivating the heating element when the temperature of the water is at or above a predetermined high point, detecting a heating element temperature with a second thermostat, and preventing the heating element from activating when the heating element temperature is at or above an overheated point that exceeds the predetermined high point.

The method may also include manually resetting the second thermostat after the preventing in order to reactivate the heating element. Further, the overheated point is below a damaging temperature that can cause damage to the heating element and/or the water containment vessel.

Figure 1:
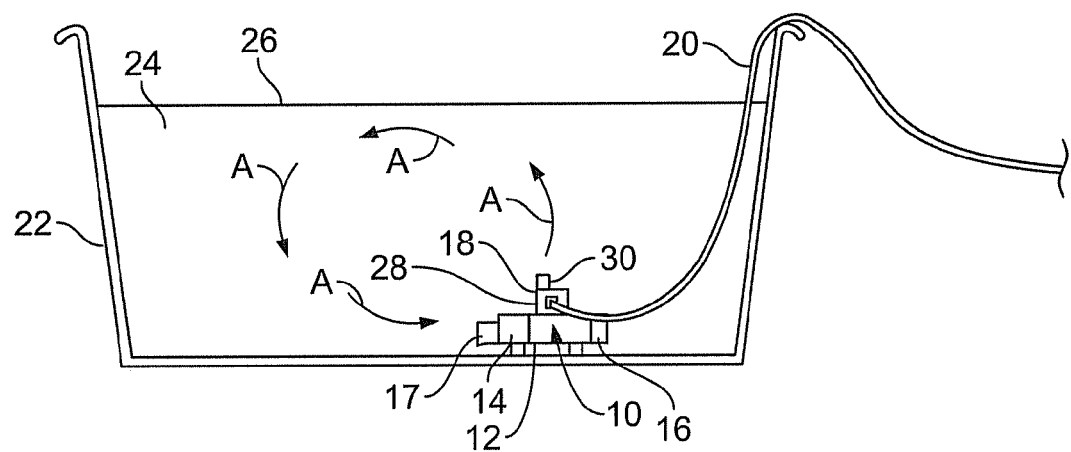
FIG. 1 illustrates a simplified view of a sinking deicing system according to an embodiment of the present invention.

The foregoing summary, as well as the following detailed description of certain embodiments of the present invention, will be better understood when read in conjunction with the appended drawings. For the purpose of illustrating the invention, there are shown in the drawings, certain embodiments. It should be understood, however, that the present invention is not limited to the arrangements and instrumentalities shown in the attached drawings.

DETAILED DESCRIPTION OF THE INVENTION

FIG. 1 illustrates a simplified view of a sinking deicing system 10 according to an embodiment of the present invention. The sinking deicing system 10 includes a main body 12 that supports a heating element 14 and temperature sensors/sensing devices, such as thermostats 16 and 17. Instead of thermostats, the system 10 may employ other such temperature sensors, such as thermometers or the like. The heating element 14 may be a coil heater contained within a cylindrical sheath. A fluid pump 18 may be secured on, to and/or within the main body 12. For example, the fluid pump 18 may be disposed on top of the main body 12 above the heating element 14 and the temperature sensor 16. The heating element 14, the thermostats 16, 17, and the fluid pump 18 are electrically connected to an insulated power cord 20 that connects the deicing system 10 to a source of power, such as a standard wall outlet. Optionally, the deicing system 10 may be powered by batteries. Alternatively, the deicing system 10 may not include the fluid pump 18.

Each of the heating element 14, the thermostats 16, 17, and the fluid pump 18 may also be electrically connected to a processing unit (not shown) located within, or remotely from, the deicing system 10. The processing unit may be used to control operation of the deicing system 10, such as shown and described in U.S. application Ser. No. 11/733,637, entitled "Fluid Heating System and Method," filed Apr. 10, 2007, which is hereby incorporated by reference in is entirety.

The sinking deicing system 10 is configured to sink to the bottom of an open-ended water receptacle 22, such as a livestock water trough, water tank, bucket or birdbath that retains water 24. As shown in FIG. 1, the water receptacle 22 includes a base integrally formed with upright outer walls. A water retention cavity is defined between the base and outer walls. The thermostat 16 detects the temperature of the water 24 proximate the deicing system 10. When the thermostat 17 detects a temperature in which the water surface 26 is susceptible to freezing, the heating element 14 is activated in order to warm the water 24. After the water 24 is heated to a temperature in which the water surface 26 will not freeze, as detected by the thermostat 17, the heating element 14 is deactivated.

The fluid pump 18 significantly reduces the temperature gradient between the bottom of the water 24 proximate the deicing system 10 and the water surface 26. Thus, the deicing system 10 is able to detect the warmed water sooner in order to deactivate the heating element 14 before the water surface 26 is excessively heated.

The fluid pump 18 may be a small pump that circulates 40-150 gallons per hour and consumes a relatively small amount of power (e.g., less than 10 watts per hour). The fluid pump 18 operates to circulate the water 24 within the water receptacle 22 in the direction of arrows A. As such, warmer water near the bottom of the water receptacle 22 is circulated to the water surface 26, thereby warming the water surface 26, while cooler water at the water surface 26 is circulated down toward the deicing system 10, where it is warmed. The fluid pump 18 draws water in through a water inlet or intake 28, and ejects water out through a water outlet 30 in order to provide the circulating water flow within the fluid receptacle 22. The water outlet 30 may be pointed upward in order to establish a circulating fluid current in the fluid receptacle 22. The fluid pump 18 may be continually activated even when the heating element 14 is deactivated. Thus, the water 24 within the fluid receptacle 22 may be continually circulated, thereby warming water at the water surface 26, and circulating cooler water to the bottom of the fluid receptacle where it is warmed through heat exchange with the warmer water at the bottom. Heat retained by the water 24 is spread throughout the fluid receptacle 22 via convection. As such, the fluid pump 18 significantly reduces or eliminates potential temperature gradients within the water 24.

Because the fluid pump 18 circulates the water 24, thereby reducing or eliminating temperature gradients, the temperature detected by the thermostat 16 at the bottom of the fluid receptacle 22 will be the same, or substantially the same, as the temperature at the water surface 26. Thus, the heating element 14 may be configured to activate at a point that is close to the freezing point of the water 24 at the surface 26. That is, the deicing system 10 does not need to take into account temperature gradients in order to set an activating trigger point for the heating element 14. Therefore, the water surface 26 is not excessively heated, and energy is saved due to the heating element 14 being operated more efficiently.

Alternatively, embodiments of the present invention may be used with a floating deicing system, although such a floating deicing system is susceptible to being contacted by animals. For example, the main body 12, the heating element 14, the thermostats 16, 17, and the fluid pump 18 may be mounted to, or secured with respect to, a floating member, such as an air filled tube, Styrofoam pontoon or ring structures, or the like. In this embodiment, the heating element 14 and the thermostats 16, 17 are disposed within the water 24 (e.g., secured to an underside of the main body 12). The fluid pump 18 is also disposed within the water 24 such that the water outlet 30 would be downwardly oriented toward the base of the fluid receptacle 22 to promote water circulation. The water circulation provides a uniform temperature throughout the water 24, thereby reducing or eliminating temperature gradients.

Figure 2:
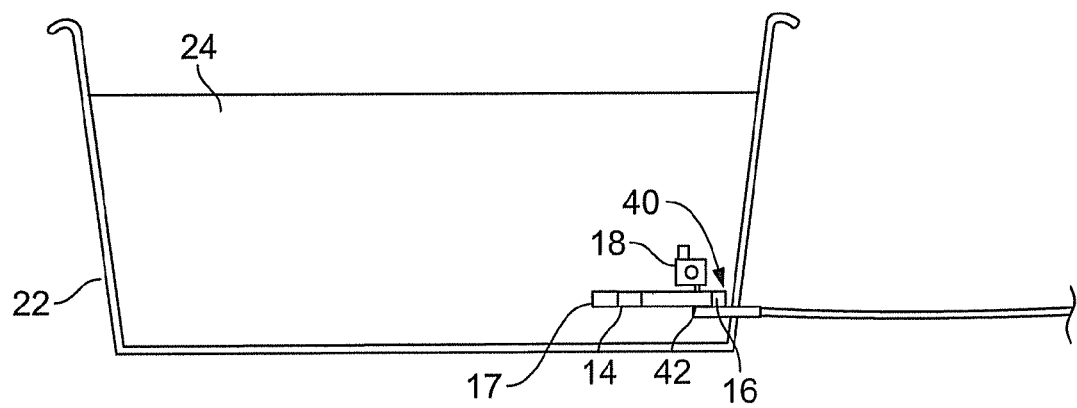
FIG. 2 illustrates a simplified view of a drain plug deicing system according to an embodiment of the present invention.

FIG. 2 illustrates a simplified view of a drain plug deicing system 40 according to an embodiment of the present invention. The drain plug deicing system 40 includes a main body 42 including a drain plug 44 that supports thermostats 16, 17, a heating element 14, and a fluid pump 18. The drain plug 44 is sealingly secured within a drain opening of a fluid receptacle 22 that is configured to retain a fluid, such as water 24. The deicing system 40 operates similarly to the deicing system 10, except that the deicing system 40 is suspended out of a drain, instead of lying submerged at the bottom of the fluid receptacle 22.

Figure 3:
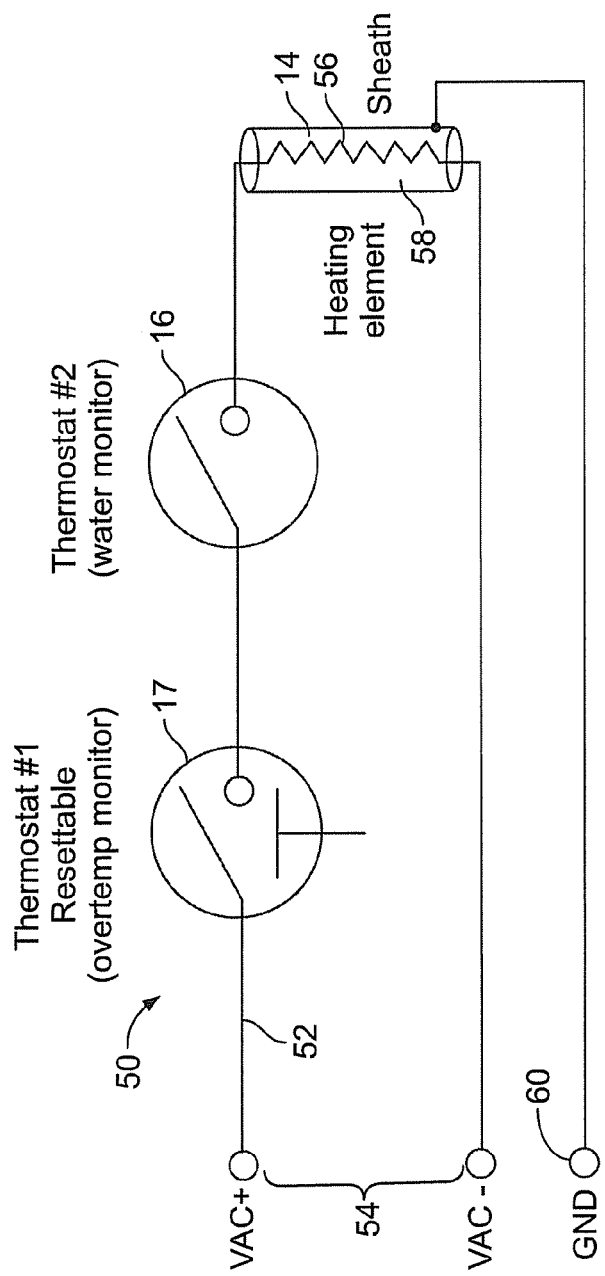
FIG. 3 illustrates a schematic diagram of a deicing circuit according to an embodiment of the present invention.
Figure 4:
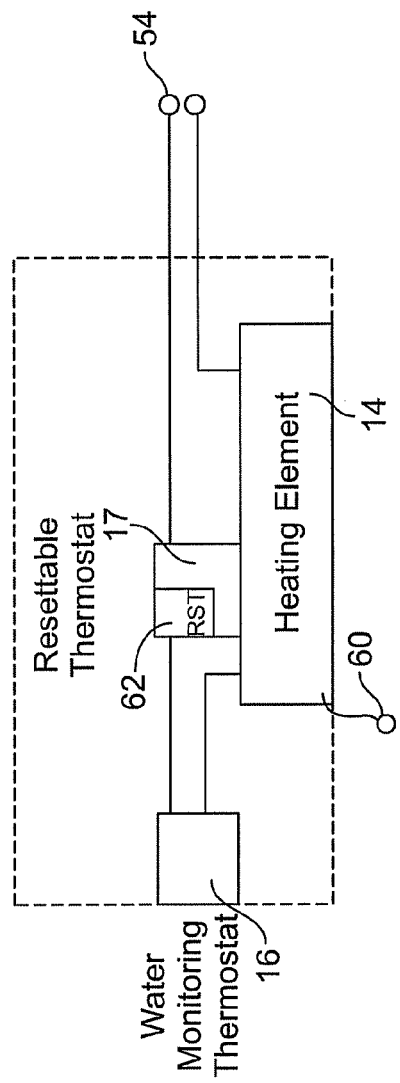
FIG. 4 illustrates a simplified block diagram of a deicing circuit according to an embodiment of the present invention.

FIG. 3 illustrates a schematic diagram of a deicing circuit 50 according to an embodiment of the present invention. FIG. 4 illustrates a simplified block diagram of the deicing circuit 50.

Referring to FIGS. 3-4, the thermostats 16 and 17 are disposed within an electrical path 52 (which may include electrical wires) between a power source 54 and the heating element 14. As noted above, the heating element 14 may include a coil 56 disposed within a protective sheath 58. The heating element 14 is, in turn, connected to ground 60. Additional components of the deicing systems discussed above, such as a fluid pump, may be also be disposed within the electrical path 52.

The thermostat 16 operates as a water monitor and may include a switch that selectively closes and opens the electrical path 52 to the heating element 14. Thus, when the thermostat 16 detects a predetermined warm temperature, the thermostat 16 "trips" and acts to open the switch and deactivate the heating element 14. Conversely, when the thermostat 16 detects a predetermined cold temperature, the thermostat 16 operates to close the switch and activate the heating element 14. A pump may be disposed in the electrical path 52 upstream from the thermostats 16, 17. As such, any switch within the thermostats 16 and 17 would not affect the pump 18. Alternatively, the pump may be activated and deactivated along with the heating element 14.

As noted above, the thermostat 16 is used to monitor the water temperature. The thermostat 17 is used, however, to monitor over-temperature conditions. The thermostat 17 may be used to directly monitor the temperature of the heating element 14 for temperatures that are only reached if water is not present. As discussed above, in the absence of water, the heating element 14 is susceptible to reaching temperatures that exceed those when the heating element 14 is immersed in water. The thermostat 17 is used to monitor such over-temperature conditions. For example, the thermostat 17 may deactivate the heating element 14 when it reaches a predetermined overheated temperature, which exceeds the point at which the thermostat 16 deactivates the heating element 14.

As shown in FIG. 4, in particular, the thermostat 17 may include a reset button 62, which may be electrically connected to the switch within the electrical path 52. Thus, when the thermostat 17 deactivates the heating element 14 after detecting the overheated temperature, the heating element 14 is prevented from re-activating until an operator manually engages the reset 62 (in a manner similar to a circuit breaker) which may be a button or separate switch. As such, the heating element 14 is prevented from entering a continuous on/off loop and reaching dangerous over-temperature conditions that may pose a fire hazard. In this manner, the dual thermostats 16 and 17 provide a level of safety that conventional deicing systems do not match.

The deicing systems may employ additional temperature sensors, such as the thermostats 16 and 17. For example, another water thermostat may be used as a backup to the thermostat 16, while another thermostat may be used as a backup to the thermostat 17. Thus, the backup thermostats provide reassuring safety backups in case the thermostats 16 or 17 malfunction. Further, the backup thermostats may be used as an accuracy check with respect to the thermostats. Each of the water thermostats may be electrically connected to alert devices, such as light emitting diodes (LEDs), when they do not open/close in synchronization with one another. That is, if the thermostat 16 trips, but the backup does not, the LEDs are activated, thereby signaling to the operator a malfunction in at least one of the thermostats. The resettable over-temperature thermostat 17 and its backup may be similarly configured.

Embodiments of the present invention provide a deicing system having a plurality of temperature control devices, in which at least one of the devices monitors water temperature, while at least one other of the devices monitors an over-temperature condition of a heating element. At least one of the temperature control devices includes a reset feature. When the temperature control device detects a predetermined tripping temperature, whether in the water or in the heating element, the device opens the electrical path to the heating element to prevent the flow of electricity thereto. The electrical path remains open until an operator manually engages the reset feature, such as a button or switch, to return the temperature control device to its closed position.

Because the resettable temperature sensing device, such as the thermostat 17, is configured to deactivate the heating element 14 only at a temperature that far exceeds the tripping temperature of the water monitoring temperature sensing device, such as the thermostat 16, the thermostats ensure that the deicing system operates to continually warm the water, but deactivate the system once water is substantially absent from the containment vessel. For example, the thermostat 16 may be configured to open the electrical path 52 when it detects a water temperature of 40° F. (for example) and closes the electrical path 52 when it detects a water temperature of 33° F. (for example). However, the thermostat 17 may be configured to open the electrical path 52 when it detects a heating element temperature of 90° F. (for example). Then, the deicing system may be reactivated when an operator resets the thermostat 17 to a closed position. In this manner, the thermostat 17 may be configured to trip at a temperature that the heating element 14 may only experience when it is not surrounded by water. That is, when immersed in water, the heating element 14 is incapable of reaching a particular overheat temperature. The thermostat 17 trips only at the overheat temperature, which it cannot reach when immersed in water. Thus, the deicing system continually operates to ensure that water within a containment vessel remains within a predetermined temperature range, and only deactivates and remains deactivated when a sensed temperature of the heating element approaches, but does not reach, a dangerous level. The temperature sensing devices may be configured to open and close the electrical path based on various temperatures, depending on particular applications.

Figure 5:
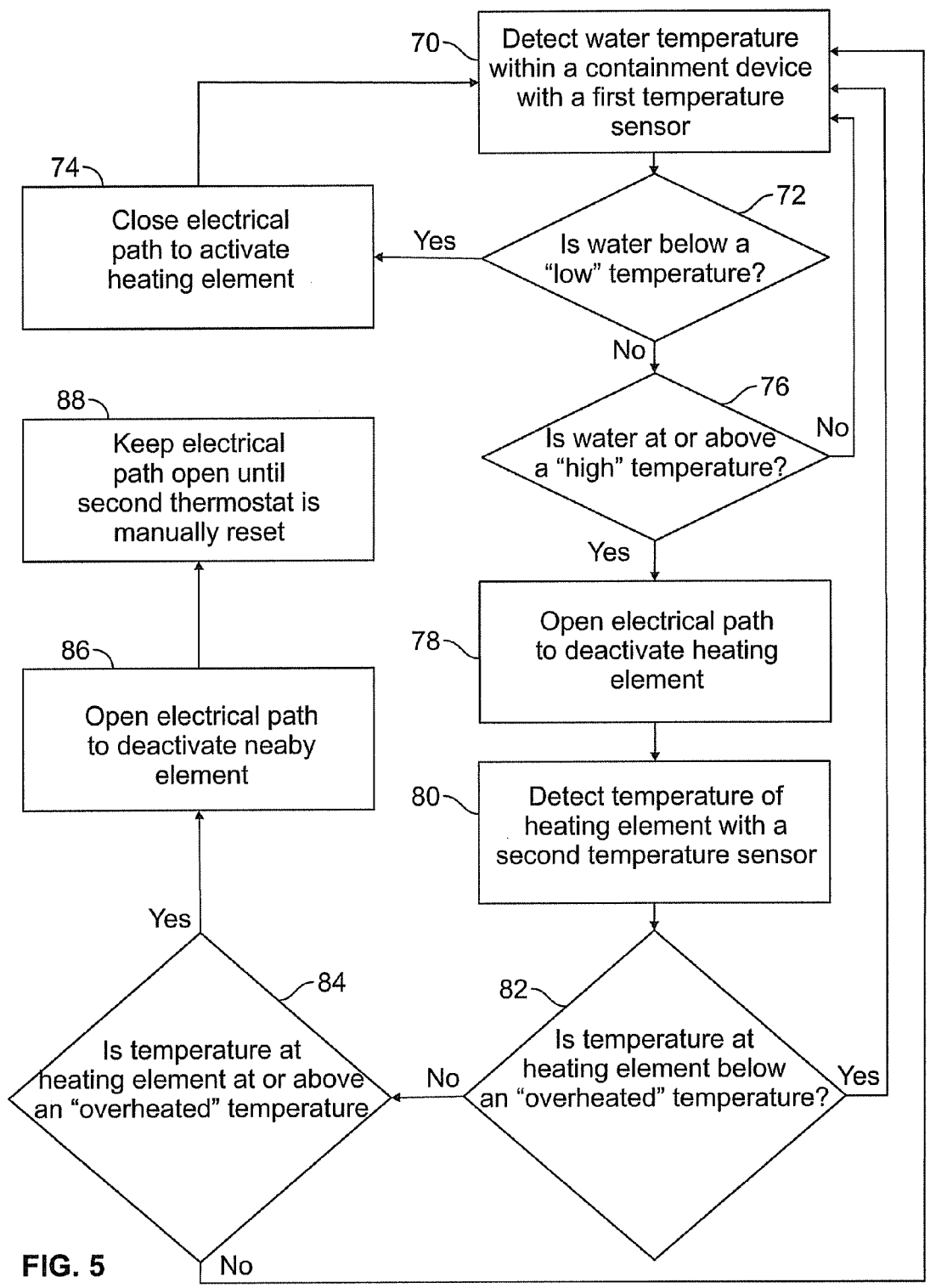
FIG. 5 illustrates a flow chart of a method of operating a deicing system according to an embodiment of the present invention.

FIG. 5 illustrates a flow chart of a method of operating a deicing system, according to an embodiment of the present invention. At 70, water temperature within a containment vessel, such as a livestock water trough or birdbath, is detected with a first temperature sensor, such as a thermostat, thermometer or the like. If, at 72, the water temperature is below a predetermined low temperature, the electrical path to the heating element of the deicing system is closed at 74 in order to activate the heating element to heat the water. The process then returns to 70.

If the water is not below the low temperature, but has not reached a predetermined high temperature 76, the process returns to 70. If, however, the water temperature is at or above the predetermined high temperature, the electrical path is opened at 78 in order to deactivate the heating element at 78.

Next, at 80, the temperature of the heating element itself is detected with a second temperature sensor, such as a thermostat, thermometer or the like. If, at 82, the temperature of the heating element is detected to be below an overheated temperature, the process returns to 70. The overheated temperature exceeds the high temperature. Indeed, the overheated temperature may greatly exceed the high temperature. For example, the high temperature may be between 40-60° F., while the overheated temperature may be between 90-120° F.

If the temperature of the heating element is not below the overheated temperature, but is instead at or above the overheated temperature at 84, the electrical path to the heating element is opened, thereby deactivating the heating element at 86. The electrical path is then kept open at 88, until the second thermostat is manually reset.

While various spatial terms, such as upper, bottom, lower, mid, lateral, horizontal, vertical, and the like may used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

The invention claimed is:

1. A deicing system configured to prevent ice from forming in a water containment vessel, the deicing system comprising:
   a heating element configured to heat the water within the containment vessel;
   a first temperature sensor electrically connected to said heating element through an electrical path, said first temperature sensor configured to monitor water temperature;
   a second temperature sensor electrically connected to said heating element through said electrical path, said second temperature sensor monitoring heating element temperature;
   one or both of a first additional temperature sensor that is configured to monitor the water temperature, or a second additional temperature sensor that monitors the heating element temperature; and
   at least one alert device that is activated when said first temperature sensor does not act in synchronization with said first additional temperature sensor and/or when said second temperature sensor does not act in synchronization with said second additional temperature sensor.

2. The deicing system of claim 1, wherein each of said first and second temperature sensors comprises a thermostat.

3. The deicing system of claim 1, wherein said first temperature sensor closes said electrical path when the water temperature is at or below a low point, and wherein said first temperature sensor opens said electrical path when the water temperature is at or above a high point.

4. The deicing system of claim 3, wherein said second temperature sensor opens said electrical path when the heating element is at or above an overheated point that exceeds the high point.

5. The deicing system of claim 1, wherein said second temperature sensor comprises a reset button, wherein said reset button is configured to be manually engaged to close said electrical path after said second temperature sensor opens said electrical path.

6. A deicing system configured to prevent ice from forming in a water containment vessel, the deicing system comprising:
   a heating element configured to heat the water within the containment vessel;
   a first temperature sensor electrically connected to said heating element through an electrical path, said first temperature sensor opening said electrical path based on a detected temperature;
   a reset button operatively connected to said first temperature sensor, said reset button configured to be manually engaged to close said electrical path after said first temperature sensor opens said electrical path based on the detected temperature;
   an additional temperature sensor that acts as a backup to said first temperature sensor; and
   an alert device that is activated when said first temperature sensor does not act in synchronization with said additional temperature sensor.

7. The deicing system of claim 6, wherein said first temperature sensor monitors heating element temperature.

8. The deicing system of claim 6, comprising a second temperature sensor electrically connected to said heating element through said electrical path.

9. The deicing system of claim 8, wherein said second temperature sensor monitors water temperature.

10. The deicing system of claim 9, wherein said second temperature sensor closes said electrical path when the water temperature is at or below a low point, and wherein said first temperature sensor opens said electrical path when the water temperature is at or above a high point.

11. The deicing system of claim 10, wherein said first temperature sensor opens said electrical path when the heating element is at or above an overheated point that exceeds the high point.

12. The deicing system of claim 6, wherein said first temperature sensor comprises a thermostat.

13. A method of preventing ice from forming within a water containment vessel, the method comprising:
   detecting a temperature of the water within the water containment vessel through a first thermostat;
   activating a heating element when the temperature of the water is below a predetermined low point;
   deactivating the heating element when the temperature of the water is at or above a predetermined high point;
   detecting a heating element temperature with a second thermostat;
   preventing the heating element from activating when the heating element temperature is at or above an overheated point that exceeds the predetermined high point;
   backing-up one or both of the first and second thermostats with at least one backup temperature sensor; and
   providing an audible or visual alert when the one or both of the first and second thermostats does not act in synchronization with the at least one backup temperature sensor.

14. The method of claim 13, comprising manually resetting the second thermostat after said preventing in order to reactivate the heating element.

15. The method of claim 13, wherein said activating a heating element when the temperature of the water is below a predetermined low point comprises closing an electrical path between the first thermostat and the heating element, and wherein said deactivating the heating element when the temperature of the water is at or above a predetermined high point comprises opening the electrical path between the first thermostat and the heating element.

16. The method of claim 13, wherein said preventing the heating element from activating when the heating element temperature is at or above an overheated point that exceeds the predetermined high point comprises keeping an electrical path between the first thermostat and the heating element open until the second thermostat is manually reset.

17. The method of claim 13, wherein said overheated point is below a damaging temperature that can cause damage to the heating element and/or the water containment vessel.

* * * * *